(12) United States Patent
West, Jr.

(10) Patent No.: US 8,533,873 B2
(45) Date of Patent: *Sep. 17, 2013

(54) INCINERATING COMMODE

(76) Inventor: James Ira West, Jr., Jonesboro, GA (US)

( * ) Notice: Subject to any disclaimer, the term of this patent is extended or adjusted under 35 U.S.C. 154(b) by 538 days.

This patent is subject to a terminal disclaimer.

(21) Appl. No.: 12/687,183

(22) Filed: Jan. 14, 2010

(65) Prior Publication Data

US 2010/0180368 A1 Jul. 22, 2010

(51) Int. Cl.
*A47K 11/02* (2006.01)
(52) U.S. Cl.
USPC ............................................. 4/111.4; 4/111.1
(58) Field of Classification Search
USPC ............... 4/111.1–111.5, 341, 462, 463, 340; 110/258, 259, 242
See application file for complete search history.

(56) References Cited

U.S. PATENT DOCUMENTS

| | | | | |
|---|---|---|---|---|
| 3,599,582 A | * | 8/1971 | Lagstrom | 110/159 |
| 3,816,857 A | * | 6/1974 | West, Jr. | 4/111.3 |
| 3,855,254 A | * | 12/1974 | Haighton et al. | 554/169 |
| 3,885,645 A | * | 5/1975 | Harrigan | 181/264 |
| 3,911,506 A | * | 10/1975 | West, Jr. | 4/111.3 |
| 6,763,528 B2 | * | 7/2004 | West | 4/111.4 |
| 7,127,748 B2 | * | 10/2006 | West, Jr. | 4/111.1 |

OTHER PUBLICATIONS

Written Opinion of the International Searching Authority for PCT/US2010/021164.*

* cited by examiner

*Primary Examiner* — Tuan N Nguyen
*Assistant Examiner* — Erin Deery
(74) *Attorney, Agent, or Firm* — J.T. Hollin, Attorney at Law, P.C.

(57) ABSTRACT

An improved incinerating commode for the disposal of human waste through injection of a combustible or cleaning fluid into the chamber where the waste is incinerated, separation of the urine component from the fecal component of human waste, the use of one or more burners, the use of a baffle to increase heat and create turbulent flow, and use of the urine component mixed with a cleaning fluid to steam clean and cool the chamber that incinerates the waste. Cyclic rate is improved by the introduction of a water cooling jacket around the combustion chamber to decrease both cooling and preheating times for the combustion chamber. Waste is directed into the combustion chamber using a splash plate.

21 Claims, 8 Drawing Sheets

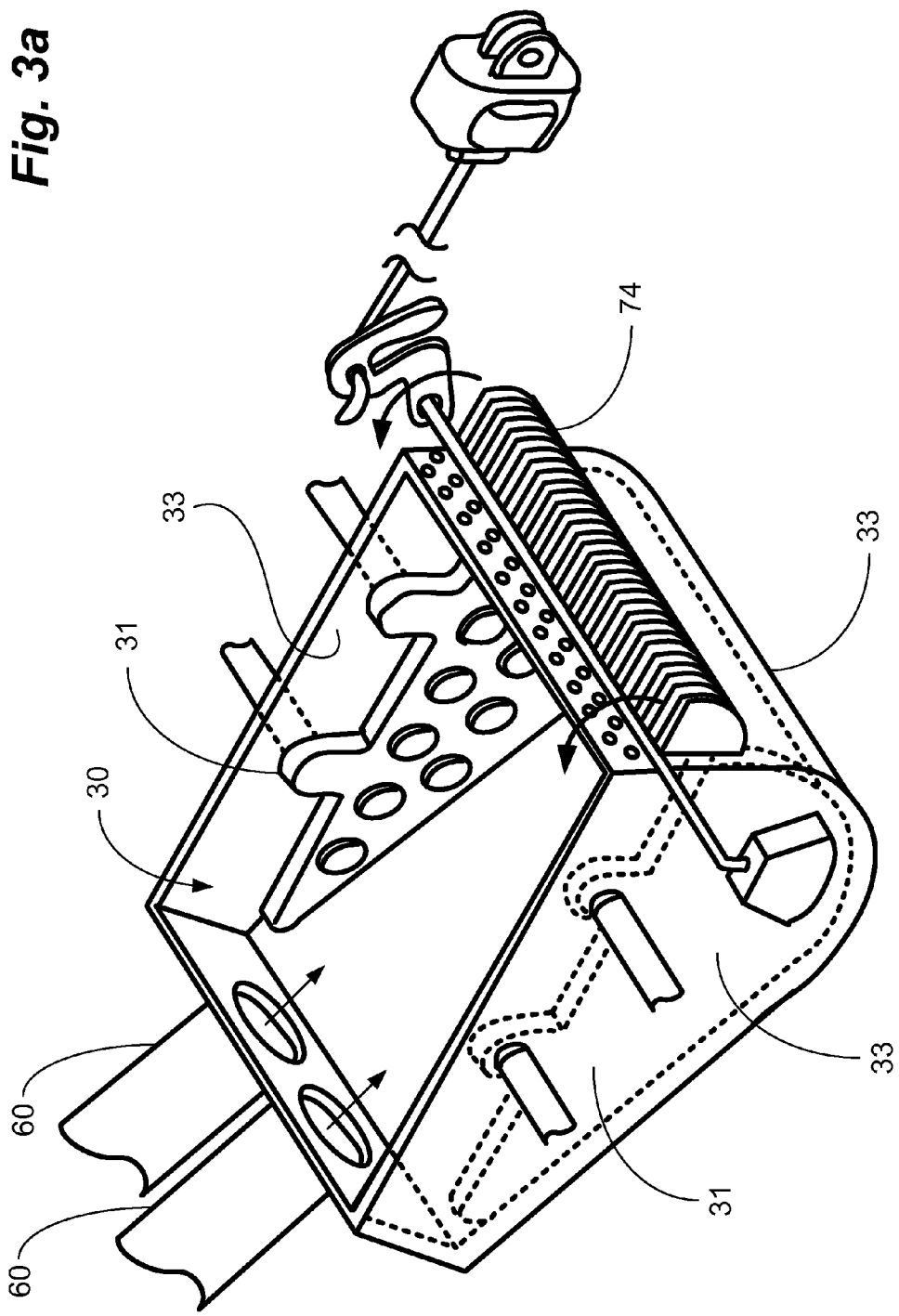

INCINERATING COMMODE

CROSS REFERENCE TO RELATED APPLICATIONS

This application claims the benefit, under 35 U.S.C. §119(e), of U.S. Provisional Patent Application No. 61/144,974, filed 15 Jan. 2009, the entire contents and substance of which is incorporated herein by reference in its entirety as if fully set forth below.

BACKGROUND OF THE INVENTION

The invention relates to an apparatus for use in disposing of human waste and more particularly a commode capable of incinerating waste.

In the field of human waste disposal, a number of methods have been employed for disposing of the solid and liquid waste. Commonly, sewage treatment plants are provided that are connected via sewage pipelines to domestic and commercial facilities. As population has increased, the capabilities of the sewage treatment plants have been severely strained. In remote areas where sewage treatment facilities are not available, septic tank means are often employed to dispose of human waste. A septic tank utilizes bacterial action in the tank to dispose of solid waste and a subterranean drainage field for disposing of the liquid waste. However, in certain areas where the soil conditions are not satisfactory, the use of septic tanks can create unhealthy conditions. A number of municipalities have adopted strict codes to regulate the use of septic tanks.

In remote areas where sewage treatment facilities are not available and where septic tanks are not feasible, oxidation ponds can be employed. Oxidation ponds utilize a fungus to dispose of the solid waste, and the liquid waste is disposed of through evaporation or surface drainage means. The use of oxidation ponds requires a large ground area and can be malodorous as well as unattractive in appearance.

A number of attempts have been made to devise chemical and incinerating commodes for use in disposing of human waste. The prior art chemical and incinerating human waste disposal apparatuses, however, are extremely complex in construction and operation, uneconomical to manufacture, and unreliable in performance. Primary disadvantages of prior art incinerating commodes are the time required to complete an incinerating operation, time required to cool the commode for reuse, and the need for frequent cleaning.

The inventor has personally worked for over twenty years devising improvements in incinerating commodes. The inventor has received numerous patents, including U.S. Pat. Nos. 3,816,857; 3,885,254; 3,855,645; 3,911,506, 6,763,528 and 7,127,748 each encompassing improvements in incinerating commode technology. However, while these prior commodes worked for their intended purpose, the cycle time, heat of combustion, and cleaning of the commode bowl all could be improved. The inventor has worked diligently in producing an economical and operationally feasible incinerating commode.

Accordingly, it is an object of the present invention to provide an incinerating commode that has an improved cycle time for the incineration of the waste.

Another object of this invention is to provide an incineration commode that uses a cleaning fluid and/or a combustible fluid to improve the efficiency of the incineration of human waste.

Another object of this invention is to provide an incineration commode that separates the urine component from the fecal component of human waste to cause the fecal component to burn more efficiently.

Another object of this invention is to provide an incineration commode that uses the separated urine component mixed with a cleaning fluid to cool and steam clean the chamber in which the fecal component is incinerated.

Additionally, it is an object of the present invention to regulate the burn of the fecal matter to ensure a quick and even burn, hence decreasing the burn cycle time and reducing particulate combustion byproducts.

Another object of this invention is to provide water-cooling of the combustion chamber to manage the heat created during the combustion process and increase cyclic rates by decreasing cooling times between burn cycles.

Another object of this invention is to provide pre-heating of the combustion chamber to minimize time and fuel required to pre-heating the combustion chamber during burn cycles.

Another object of this invention is to provide a baffle to increase the turbulence in the combustion chamber to increase the heat of combustion, thereby reducing burn cycle time and particulate combustion byproducts.

BRIEF SUMMARY OF THE INVENTION

The present invention contemplates a novel and non-obvious commode for the incineration of human waste. The present invention is improved over prior art incinerating commodes by the utilization of at least one of the following or a combination thereof: injecting a combustible fluid into the chamber where the waste is incinerated; separating the urine component from the fecal component of human waste; creating turbulence in the combustion chamber to improve combustion and reduce combustion byproducts, and/or providing liquid cooling and/or preheating of the combustion chamber.

Embodiments of the present invention can comprise an incinerating commode for use in disposing of human waste. The incinerating commode can comprise a commode body having a commode interior and a combustion chamber in communication with said commode interior for receiving the fecal component of the human waste. The commode can have a urine collector carried within said commode interior for receiving a urine component of said human waste and separating it from the fecal component. The urine collector can be in fluid communication with a urine container for storing the urine component. In some embodiments, the urine collector can further comprise an overflow port. If the urine container becomes full, excess urine can be routed to a drain, septic system, or other drain field.

In some embodiments, a cleaning agent container can be disposed proximate the commode body for storing a cleaning agent. The commode can further comprise a heat source for incinerating the fecal component. In some embodiments, a baffle can be used and can be disposed in a rear portion of the combustion chamber. The baffle can comprise a first, closed position and a second, open position. In the first position, the baffle can substantially seal the rear portion of the combustion chamber. In the first position, the baffle can direct the fecal component into the combustion chamber. In the second position, the baffle can create a turbulent, recirculating flow in the combustion chamber to improve combustion efficiency in the combustion chamber.

The incinerating commode can further comprise a commode lid pivotally coupled to the commode body. The lid can comprise a first, open position and a second, closed position. The commode lid can also be pivotally coupled to the baffle.

When the lid is in the open position, the baffle can be in the closed position to substantially seal a rear portion of the combustion chamber. In this position, the baffle can direct the fecal component into the combustion chamber. When the lid is in the closed position, the baffle can be in the open position to increase the turbulence in the combustion chamber during incineration. The baffle can be used to create a recirculating flame front to increase the heat in the combustion chamber. This additional turbulence increases the heat of combustion, increasing the completeness of the burn cycle, and reducing the amount of ash produced during the incineration process.

The commode can further comprise a blower in fluid communication with the cleaning agent container and the urine container. In some embodiments, the cleaning agent can contain chlorine. The blower can be used to inject a cleaning fluid into the combustion chamber for cooling and cleaning the combustion chamber after incineration of the fecal component. The cleaning fluid injected by the blower can comprise a mixture of urine from the urine container and cleaning agent from the cleaning agent container.

In some embodiments, an additional conduit can be connected to a spray nozzle located in a front portion of the combustion chamber. When the combustion cycle is complete, the spray nozzle can spray cleaning fluid into the combustion chamber to clean and cool the combustion chamber after a burn cycle. In some embodiments, a small pump can be provided to pump cleaning agent from the cleaning agent container and the urine container to the spray nozzle.

In some embodiments, the commode can further comprise a splash plate, disposed between the commode body and the combustion chamber, with inwardly sloping sides to direct waste into the combustion chamber and away from other components. In some embodiments, the heat source can comprise one or more natural gas, propane, diesel fuel, or fuel oil burning torches.

Embodiments of the present invention can also comprise an incinerating commode for use in disposing of human waste comprising a fluid cooled combustion chamber, in communication with the commode interior for receiving the fecal component of the human waste. The combustion chamber can also be in fluid communication with a hot water source. In this manner, the water from the hot water source can pre-heat the combustion chamber to improve efficiency of the combustion chamber. In some embodiments, the heat generated during incineration is absorbed by the water from the hot water source to cool the combustion chamber and reduce commode cycle time.

The incinerating commode can further comprising a water circulation pump to circulate water between the incinerating commode and the hot water source. In some embodiments, the heat absorbed by the water from the hot water source can be used to raise the temperature of the water in the hot water source. This can improve the efficiency of the hot water source by recovering heat from the combustion process that would otherwise be wasted. In some embodiments, the hot water source can be a hot water heater or a boiler. To recover additional waste heat from the combustion process, the commode can also be fitted with a heat exchanger. The heat exchanger can recover excess heat from the exhaust of the incinerating commode.

In some embodiments, the commode can further comprise one or more mesher assemblies. Each mesher assembly further can comprise a mesher for breaking up the fecal component and intermixing the cleaning fluid therewith. The mesher assembly can further comprise a mesher arm and a slide arm, coupled in a perpendicular manner to the mesher. The slide arm can support the mesher assembly where it passes through the combustion chamber on a mesher bearing. The mesher bearing can support the mesher assembly on the slide arm and reduce the sliding friction of the mesher assembly on the slide arm as it oscillates.

A control plate can be used to couple the mesher arm, the slide arm, and the mesher solenoid in a parallel, but offset, manner. The mesher assembly can further comprise a mesher solenoid for moving the mesher back and forth in an oscillating motion within the combustion chamber. In some embodiments, the mesher solenoid can comprise an air solenoid, an electric solenoid, or a hydraulic solenoid. In some embodiments, the mesher assembly can be supported by the mesher solenoid, obviating the need for a mesher bearing.

Embodiments of the present invention can also comprise a method for disposing human waste in an incinerating commode. The method can comprise receiving the fecal component of human waste in a combustion chamber. The method can further comprise separately receiving the urine component of human waste in a urine collector. A first portion of a cleaning fluid, comprising a mixture of the urine component combined with a cleaning agent, can be injected into the combustion chamber. The cleaning fluid can be intermixed with the fecal component and the fecal component broken up by oscillating one or more mesher assemblies.

Prior to incineration, a baffle, disposed in a rear portion of the combustion chamber, can be opened to create a turbulent flow in the combustion chamber during incineration. The fecal component intermixed with the cleaning fluid can be incinerated with a heat source, such as a torch. After incineration, the oscillating motion of the meshers can be stopped. A vacuum source can be used to remove any remaining ash from the combustion chamber. A second portion of cleaning fluid can be injected into the combustion chamber. The cleaning fluid can clean and cool the combustion chamber. In other embodiments, the mesher assembly can continue to oscillate to enable the mesher assembly to be cleaned and cooled, along with the combustion chamber, after incineration. In some embodiments, the blowers may continue to run to assist in cooling the combustion chamber, further reducing cycle times.

In some embodiments, the first portion of cleaning fluid may also comprise a combustible fluid to be intermixed with the fecal component and aid combustion thereof. In some embodiments, the first portion of cleaning fluid can be approximately 2 ounces. In some embodiments, the combustion chamber can be preheated by activating a water circulation pump in fluid communication with a hot water source and a water jacket surrounding the combustion chamber. In some embodiments, the heat generated during the incinerating step can be used to heat the water in the hot water source. The relatively low temperature of the hot water source can maintain the outside of the combustion chamber water jacket, and thus the outside of the commode, at a desirable temperature.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages, and novel features of embodiments of the invention will become apparent from the following detailed description of the invention when considered in conjunction with the drawings.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3a depicts a perspective of a combustion chamber, in accordance with some embodiments of the present invention.

DETAILED DESCRIPTION OF PREFERRED EMBODIMENTS

To facilitate an understanding of the principles and features of the invention, it is explained hereinafter with reference to its implementation in an illustrative embodiment. In particular, the invention is described in the context of being an incinerating toilet for the disposal of human waste.

Figure 1A:
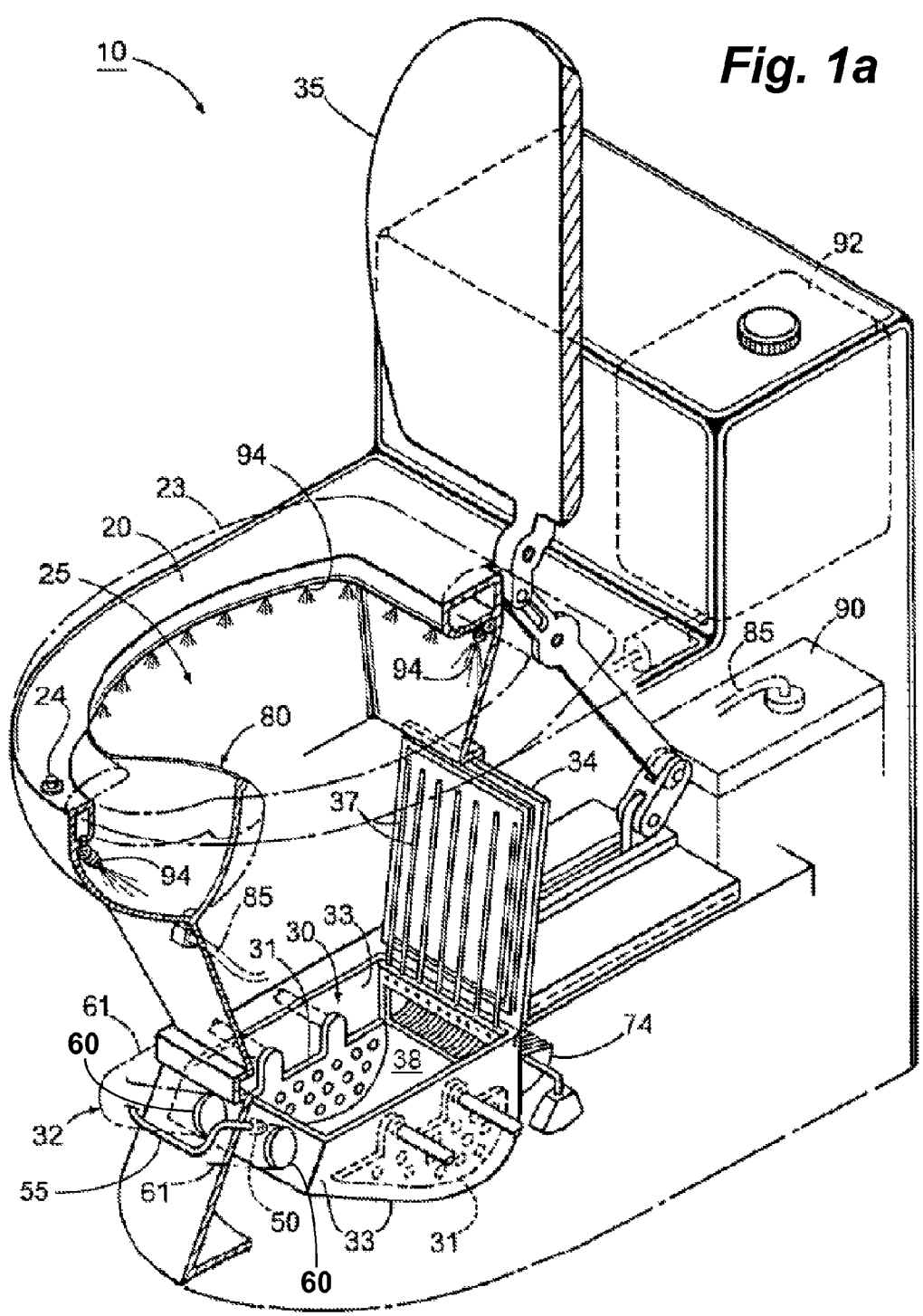
FIG. 1a is a cutaway-view of an incinerating commode, in accordance with some embodiments of the present invention.
Figure 2:
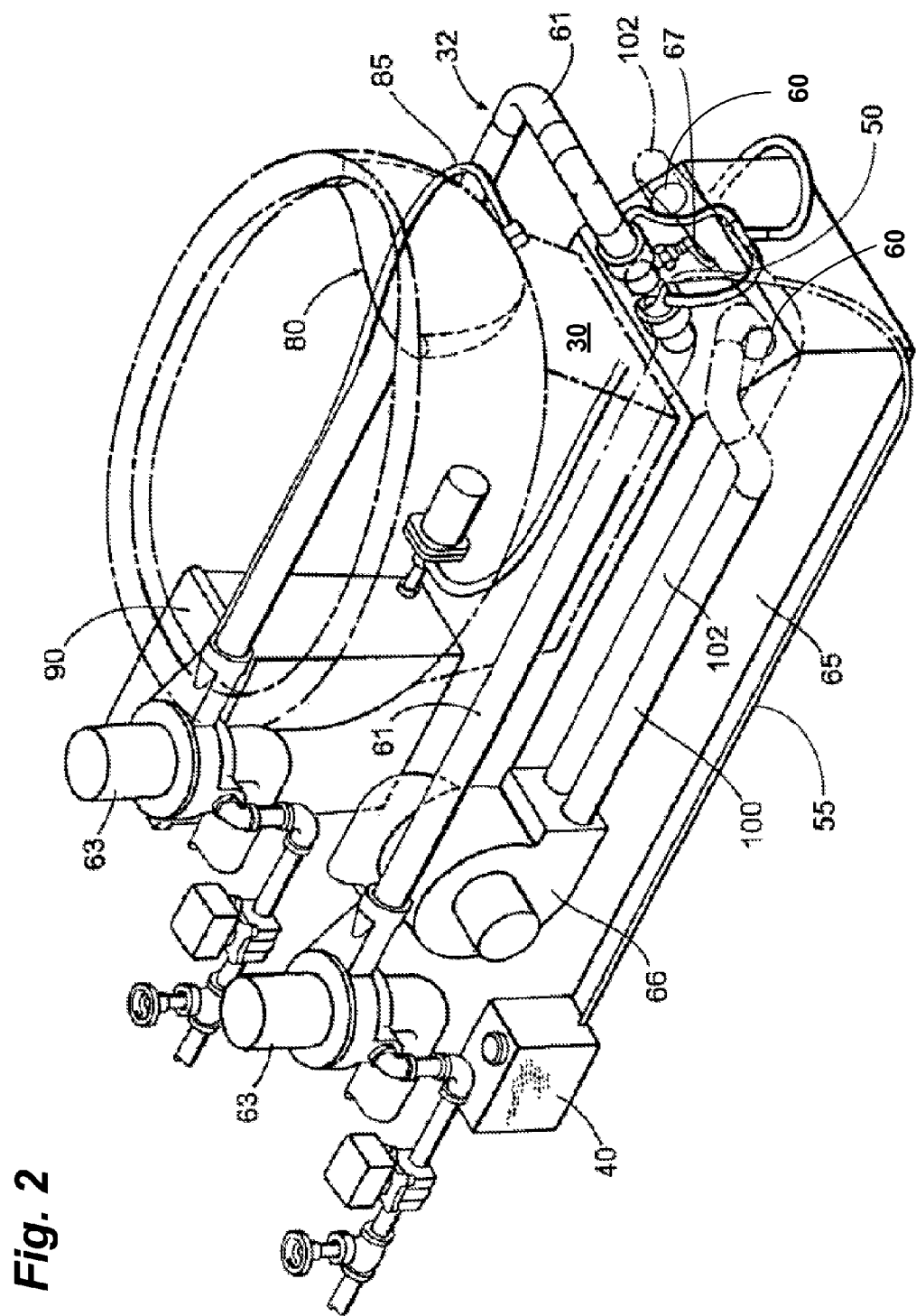
FIG. 2 depicts a perspective of the incinerating commode, in accordance with some embodiments of the present invention.

Referring now in more detail to the drawings, as can be seen in FIGS. 1a and 2, an incinerating commode 10 capable of disposing of human waste is shown according to one embodiment of the invention. In a first embodiment, the incinerating commode 10 can comprise a commode body 20 that defines a commode interior 25. A combustion chamber 30 is disposed in communication with the commode interior 25 for receiving a fecal component of said human waste. A combustible fluid system 32 can optionally provide combustible fluid to the combustion chamber 30 for intermixing with the fecal component.

As illustrated in FIG. 1a, the commode body 20 has a bottom opening in communication with the combustion chamber 30. A conventional commode seat 23 can be carried by the commode body 20. The commode seat 23 can be pivotally supported on the commode body 20. A pressure sensitive button 24 can be located beneath commode seat 23 and used for, for example, activating a pre-heating element, a vacuum system, and/or a bowl cleaning system as hereinafter described.

Figure 1B:
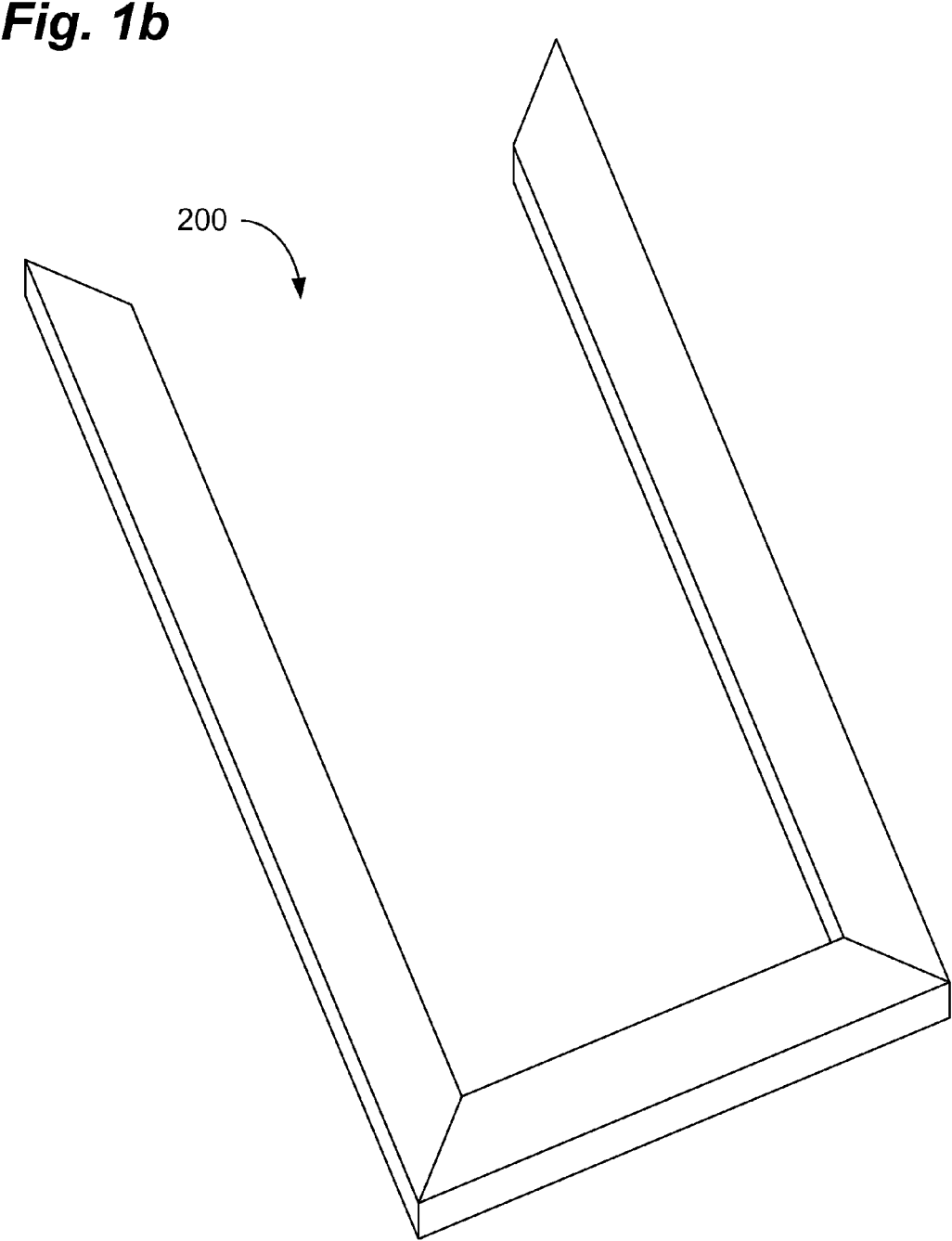
FIG. 1b depicts a perspective view of a splash plate for use on the incinerating commode of FIG. 1, in accordance with some embodiments of the present invention.

In some embodiments, for example as shown in FIG. 1b, a splash plate 200 can be placed between the commode body 20 and the combustion chamber 30. The splash plate 200 can have inwardly sloping sides to direct waste into the combustion chamber 30 and away from other components. The splash plate 200 can provide a seal between the combustion chamber 30 and the commode body 20. This may be desirable to lower productions costs by, for example, simplifying the molding process for the commode body 20 where it meets the combustion chamber 30. In some embodiments, the splash plate 200 can be manufactured from thermally insulative materials or can further comprise thermal insulating gaskets to prevent heat transfer from the combustion chamber 30 to the commode body 20.

Figure 5:
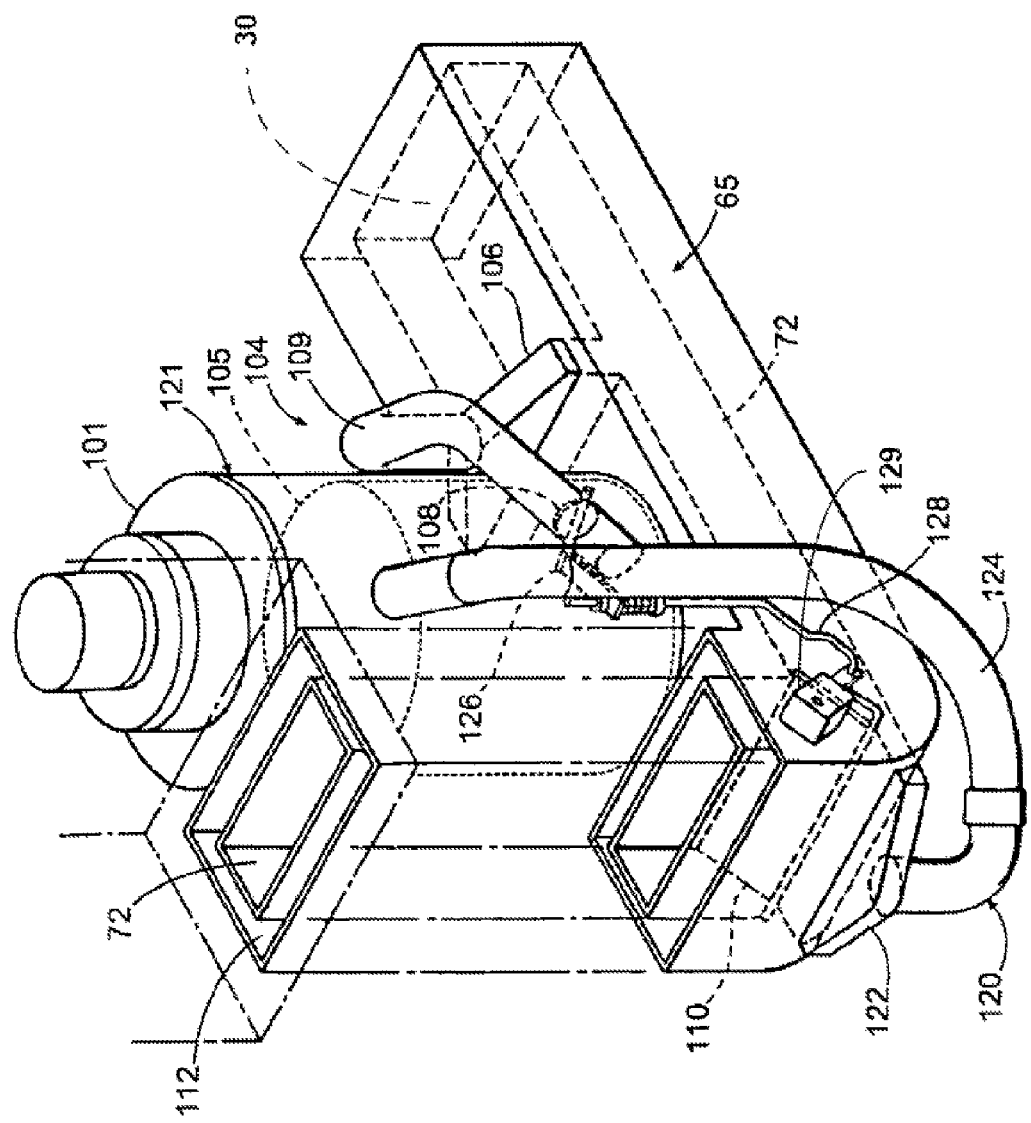
FIG. 5 illustrates a venting system of the incinerating commode according to some embodiments of the present invention.

As shown in FIGS. 1a and 3a, the combustion chamber 30 can be defined by sidewalls and a bottom wall 33, and a lid 34. The combustion chamber lid 34 can be connected to a commode lid 35 such that the combustion chamber lid 34 is closed when the commode lid 35 is positioned horizontally. The combustion chamber lid 34 provides an airtight seal when in a closed position providing for a secure combustion chamber 30. In an exemplary embodiment, the combustion chamber lid 34 can include offset tines 37 for pushing toilet tissue into the combustion chamber 30. Additionally, as shown in FIG. 5, in some embodiments, a vacuum 101 can provide suction to the combustion chamber 30 during and after use to manage odor and pull tissue paper and waste into the combustion chamber 30.

As shown in FIG. 3a, offsetting meshers 31 can be provided within the combustion chamber. Meshers 31 can be provided with a motor driven solenoid (not shown) for moving the meshers 31 inwardly into substantial abutting contact with each other and then outwardly to a position adjacent to the sidewalls 33. During the inward movement of the meshers 31, trapped material is broken up into smaller pieces facilitating efficient incineration. This process can be facilitated by injecting a small quantity of cleaning fluid into the combustion chamber 30. The cleaning fluid can wet the walls of the combustion chamber 30, preventing waste from sticking thereto, and improving the efficiency of the burn cycle.

Figure 3B:
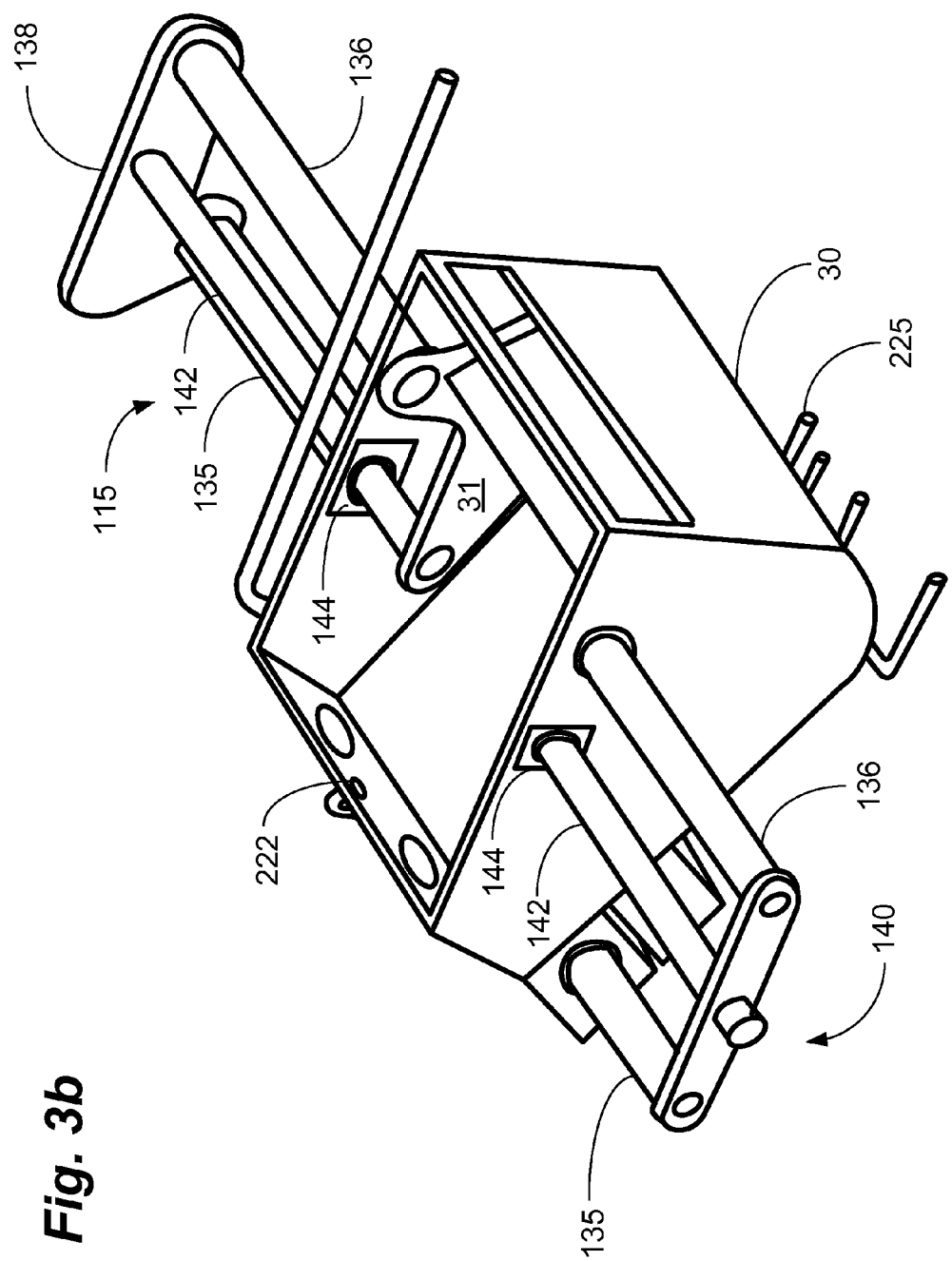
FIG. 3b depicts a perspective view of a combustion chamber, including a mesher assembly, in accordance with some embodiments of the present invention.

In other embodiments, shown in FIG. 3b, the meshers 31 can form part of a mesher assembly 115. Each mesher assembly 115 can comprise a mesher 31, a mesher arm 136, a control plate 138, and a mesher solenoid 135. The mesher solenoid 135 can be powered, for instance and not by limitation, hydraulically, pneumatically, or electrically, and can have, for example, a linear or arcuate motion. One or more mesher assemblies 115 can be used, with a preferred configuration using two mesher assemblies 115. In some embodiments, the mesher assembly 115 can be supported by the mesher solenoid 135.

In an exemplary embodiment, the mesher assembly 115 can comprise a bearing slide group 140 to provide additional support to the mesher assembly 115 (i.e., in addition to the mesher solenoid 135). The bearing slide group 140 can comprise a slide arm 142, a mesher bearing 144, and can be detachably or permanently affixed to the control plate 138. The bearing slide group 140 can provide support for the mesher assembly 115 and allow the mesher arms 136, and thus the meshers 31, to travel freely in a linear path. The bearing slide group 140 can prevent wear on the mesher arms 136, the mesher solenoids 135, and the combustion chamber 30 because the weight of the mesher assembly can be supported by the mesher bearing 144.

The mesher bearing 144 can comprise many types of bearings suitable to reduce friction on the slide arm 142 and support the weight of the mesher assembly 115. In some embodiments, the mesher bearing can be, for example and not by limitation, a ball bearing, a roller bearing, a needle bearing, or a plain bearing. The bearing slide group 140 also advantageously limits or prevents twisting and/or rotating of the mesher assembly 115, thus improving meshing action, increasing mesher solenoid 135 life, and further reducing wear to mesher components.

Referring back to FIG. 1a, the combustion chamber lid 34 can be pivotally connected to the combustion chamber 30 and can support movement from an open position to a closed position. In the open position, waste and paper can be transferred into the combustion chamber 30. In some embodiments, the vacuum 101 can be used to draw waste and paper into the combustion chamber 30 during use. See, e.g., FIG. 5. In the closed position, the combustion chamber lid 34 can seal the combustion chamber 30 for the incineration process.

As shown in FIGS. 1a and 2, the combustible fluid system can include a combustible fluid housing 40 that stores a combustible fluid. The combustible fluid housing 40 can be in fluid communication with a combustible fluid injector 50 by a fuel conduit 55, which in some embodiments can be a flexible fuel line. The combustible fluid housing 40 can have a pump disposed within for transferring the combustible fluid from the combustible fluid housing 40 to the combustible fluid injector 50 or can be configured to utilize a gravity feed system. The pump can include a conventional electrical motor for dispensing a predetermined quantity of fluid in response to each cyclic operation.

The combustible fluid housing 40 is preferably located such that it is removed from the incineration process, such as behind the commode body 20. The injection of combustible fluid into the combustion chamber 30 is allowed only when combustion chamber lid 34 is closed. The combustible fluid injector 50 can inject a set quantity of combustible fluid into the combustion chamber 30. In an exemplary embodiment, this amount can be two ounces, but this amount can be adjusted by adjusting the pump inside the combustible fluid housing 40 relative to the amount of fecal component that needs to be incinerated, ambient temperature, and other variables. The combustible fluid can decrease burn time, but is not essential to the completion of the incineration process. In some embodiments, due to, for example, cost or availability of combustion fluid, the combustible fluid can be omitted.

In an alternative embodiment, shown in FIG. 3b, cleaning fluid can be injected into the combustion chamber 30 using a nozzle 222 in addition to, or instead of, a combustible fluid. In an exemplary embodiment, a set quantity of cleaning fluid may be injected into the combustion chamber 30 to facilitate reduction of fecal matter from a solid to a liquid, or semi-liquid, state and prevent adhesion of solid waste to the commode 10. In some embodiments, this quantity may be two ounces, but can be adjusted as needed. This can reduce burn times by facilitating the action of the meshers 31 and by reducing solid waste to a state that is more readily burned.

As shown in FIG. 3a, the combustion chamber 30 can be provided with a heat source 60 for incinerating the fecal component of human waste. In some embodiments, this heat source 60 can be a pair of gas burning torches. In other embodiments, the heat source 60 can be many suitable heat sources such as, for example a not by limitation, a single fuel oil torch. The heat source 60 can be supplied with a variety of fuel sources depending on, for example, availability, cost, and/or environmental concerns. The heat source 60 can be supplied with a gaseous fuel source such as, for example and not by limitation, propane, natural gas, or butane. In an alternative embodiment, the heat source 60 can burn liquid fuels such as, for example and not by limitation, diesel fuel, fuel oil, or gasoline, that can be supplied to the burners by a fuel pump. The heat source 60 can be manually engaged, or timed. The burn time can vary with, among other things, the type of fuel used. A preferred burn time is one and a half minutes to five minutes. A timer will turn the heat source 60 off after the desired burn time.

Referring back to FIG. 2, the heat source 60 can be supplied with a gas and pressurized air mixture by a fuel conduit 61. The fuel conduit 61 can carry fuel received from a fuel source which can be intermixed with air via blowers 63. In some embodiments, the blowers 63 can receive air from the outside environment to limit or prevent consumption of conditioned, indoor air. The heat source 60 can also include a conventional spark igniter 67, or other suitable ignition means. The heat source 60 can be manually activated or electronically activated after the combustion chamber lid 34 is closed.

In an exemplary embodiment, shown in FIGS. 1a, two gas burning torches 60 are offset from one another with their respective nozzles located between the meshers 31 so as to define a gas burning area 38 that encompasses the area between the meshers 31 and within the combustion chamber 30. It has been found that two gas burning torches 60 operate effectively and efficiently to burn the fecal matter within the gas burning area 38. In an alternative embodiment, a single fuel oil torch can operate effectively, and in some cases more economically, due to the increased heat content of fuel oil. The combustion chamber 30 can be enclosed in a housing with an air gap to keep the heat confined to the combustion chamber 30 and away from the user. In addition, the burn cycle cannot be initiated unless and until the combustion chamber lid 34 is closed, sealing the combustion chamber 30.

As shown in FIG. 2, to lower temperatures around the combustion chamber 30, air can be circulated around the combustion chamber 30. The combustion chamber 30 can be mounted in a double-walled external housing 65 creating a space between the combustion chamber 30 and external housing 65 for airflow to circulate around the combustion chamber 30. Cooling air can be provided via a blower 66 that utilizes air lines 100 and 102 for blowing air around the combustion chamber 30 and through the external housing 65. In some embodiments, blower 66 can receive air from the outside environment to limit or prevent consumption of conditioned, indoor air.

Figure 4A:
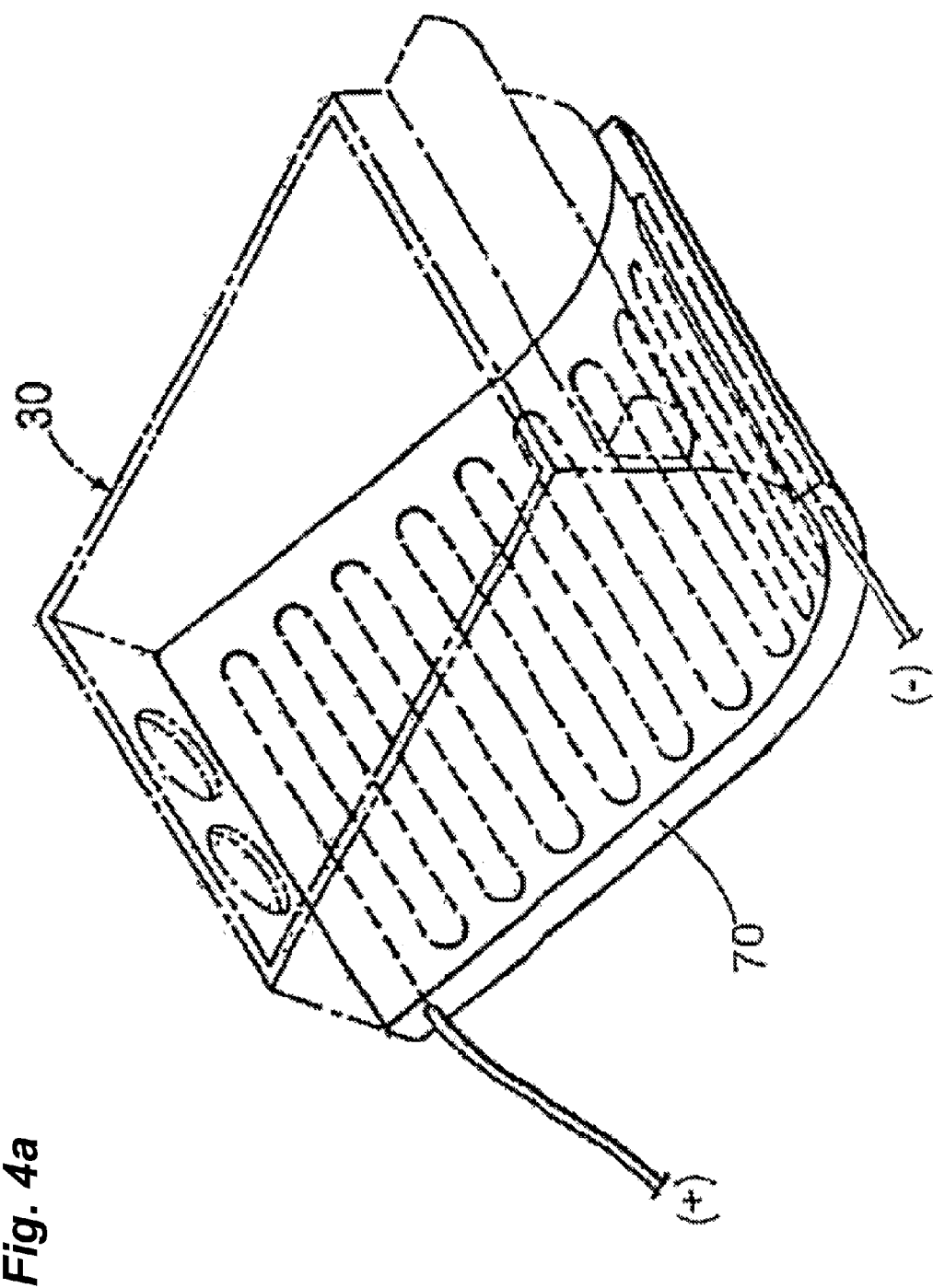
FIG. 4a depicts a perspective view of an electric pre-heating element installed on a combustion chamber, in accordance with some embodiments of the present invention.

As shown in FIG. 4a, an additional heat source 70 can be located beneath the combustion chamber 30 to preheat the combustion chamber 30 prior to the incineration process. The additional heat source 70 is not strictly necessary, but preheating the combustion chamber 30 can enable the heat source 60 to burn the fecal component more efficiently, because less energy is wasted heating the combustion chamber 30 and the fecal matter itself. In some embodiments, this heat source 70 can be an electric heat plate located directly beneath and in contact with the bottom wall of the combustion chamber 30.

Figure 4B:
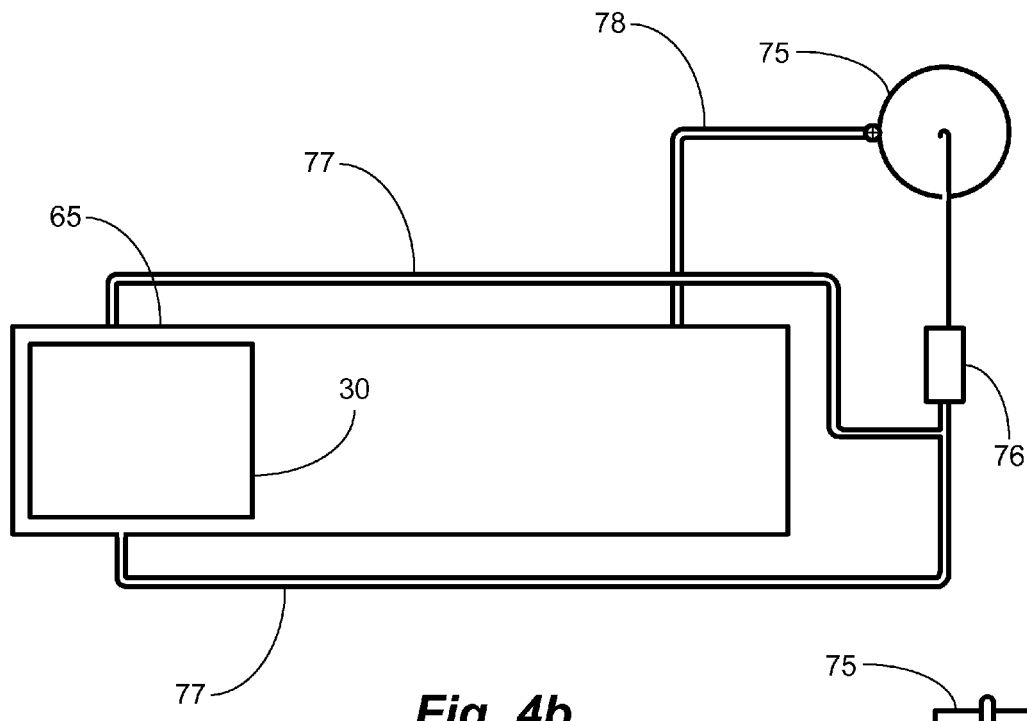
FIG. 4b depicts a top view of a water pre-heating system installed on a combustion chamber, in accordance with some embodiments of the present invention.
Figure 4C:
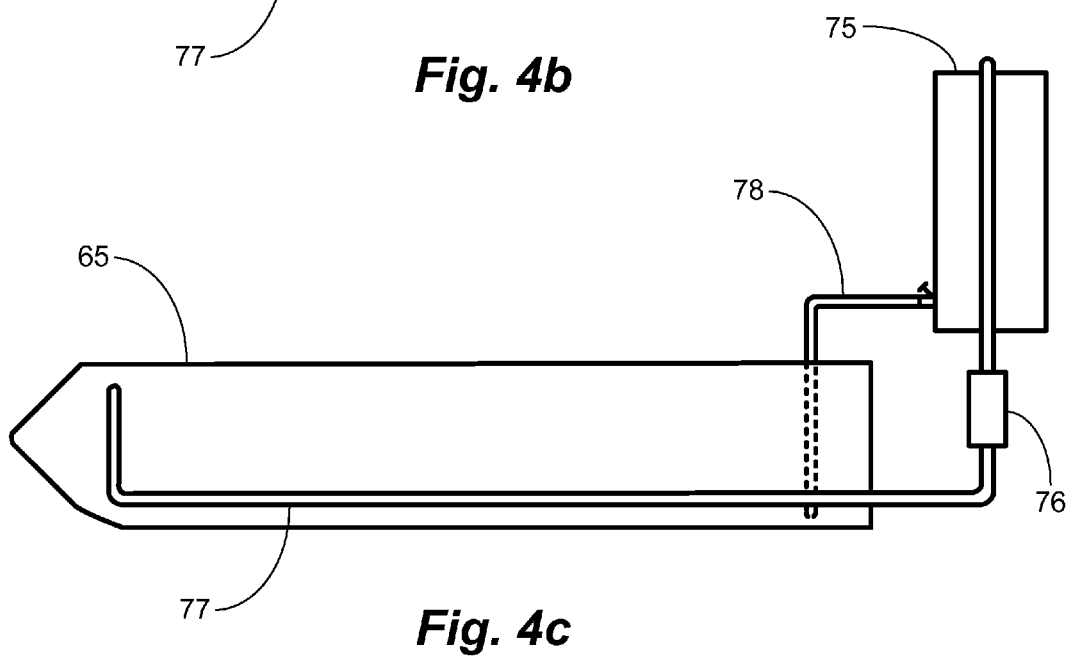
FIG. 4c depicts a side view of a water pre-heating system installed on a combustion chamber, in accordance with some embodiments of the present invention.

As shown in FIGS. 4b and 4c, in an alternative embodiment, the external housing 65 can be fluid cooled. In some embodiments, the external housing 65 can be of a double-walled construction allowing cooling fluid to be circulated through the external housing 65 using a fluid pump 76. The external housing 65 can serve as a heat sink to absorb heat from the combustion chamber 30 and surrounding area during the incineration process. The higher specific heat of water, as compared to air, can enable the temperature of the combustion chamber 30 and surrounding area to be maintained at more consistent levels during use, and can enable the combustion chamber 30 to be cooled more quickly after use, improving cyclic rates.

In some embodiments the cooling fluid can be water and the external housing 65 can be connected to a hot water source 75 such a household or commercial hot water heater or boiler. This can enable the combustion chamber 30 to remain at relatively the same temperature as the hot water source 75 and decrease the fuel and time required to pre-heat the combustion chamber 30 during a burn cycle. Additionally, the heat carried away by the cooling fluid during a burn cycle can be utilized to heat the water in the hot water source 75, thus reducing energy consumption.

In some embodiments, one or more supply lines 77 can be provided to supply water to the external housing 65. Similarly, one or more return lines 78 can be provided to return water to the hot water source 75. In a preferred embodiment, as shown in FIGS. 4*b* and 4*c*, the supply lines 77 can be coupled to an upper portion of the external housing near the combustion chamber 30 and the return line(s) 78 can be coupled to a rear, lower portion of the housing 65. This configuration has been shown to provide improved flow through the housing 65, though other configurations are contemplated.

As shown in FIGS. 3*a* and 5, the rear of combustion chamber 30 can be in communication with a flue 72 that can communicate with a vent 112 to the ambient environment or to a fire proof bag 105. When the combustion chamber 30 is closed, the heat produced from the heat source 60, will burn the fecal matter producing ash. An ash control valve 126 operates to connect the flue 72 with the fire-proof bag 105 directing the ash to the fire proof bag 105 when the incineration phase of the incinerating commode has been completed, though, as mentioned below; current improvements reduce ash to negligible levels.

The burn of the fecal matter can be controlled by a baffle 74. As shown in FIGS. 3*a* and 5, the baffle 74 is disposed between combustion chamber 30 and flue 72. The baffle 74 can include a plurality of offset tines that define a plurality of air channels for restricting the flow of air and ash through flue 72. In some embodiments, the tines can be offset by an eighth of an inch. In some embodiments, the baffle 74 is carried on the back wall or side wall of the combustion chamber 30. The bottom of the baffle 74 can be pivotally coupled to the combustion chamber 30 such that in a first position it seals the rear of the combustion chamber 30 and in a second position the top of the baffle 74 rests against the rearmost set of meshers 31 partially opening the flue 72.

As shown in FIG. 1*a*, in some embodiments, the baffle 74 can be connected to the commode lid 35 such that when commode lid 35 is open, the baffle 74, in the first position, seals the rear of the combustion chamber 30 to contain fecal matter and other waste therein and prevent it from entering the flue 72 during use. When the commode lid 35 is closed to initiate a burn cycle, the baffle 74 can be in the second position, with the upper end of the baffle 74 against, or in close proximity to, the top of the rearmost mesher 31; this produces an unexpected result.

The position of the baffle 74 reflects the flame from the heat source 60 back onto the fecal component increasing the heat in the combustion chamber. The baffle 74 can also create highly turbulent, circular airflow in the combustion chamber increasing the heat in the combustion chamber 30. One of skill in the art might assume that this flow would cause unburned fecal matter to be ejected from the combustion chamber 30 and into the flue 72. In practice, however, this turbulence creates a recirculating flow that serves to hold the fecal matter in the combustion chamber 30 until combustion is complete. Therefore, the fecal component and/or combustion products thereof do not leave the combustion chamber despite the baffle 74 being in a partially open position. This turbulent flow and reflection of the flame back into the combustion chamber, coupled with mixing the fecal matter with a combustible fluid or cleaning fluid, completely burns the fecal component inside the combustion chamber 30, resulting in negligible particulates in the exhaust and negligible ash remaining in the combustion chamber 30 after incineration is complete.

While the fecal material is being incinerated, meshers 31 can be continuously oscillating within the combustion chamber 30 breaking the solid fecal matter into smaller components. To facilitate burning, a combustible fluid is injected into the combustion chamber 30 prior to the ignition of the heat source 60. This combustible fluid can be mixed with the solid fecal material by meshers 31. Preferably, between two ounces of combustible fluid or cleaning fluid is mixed with the fecal matter. After a pre-determined time of fecal matter preparation, the heat source 60 is ignited initiating the burning process.

In an alternative embodiment, cleaning fluid can be used instead of, or in addition to, combustible fluid. In some embodiments, cleaning fluid can be injected into the commode interior 25 using spray nozzles 94 prior to ignition of the heat source 60. The cleaning fluid can prevent waste from adhering to the commode interior 25, and other commode components, and reduce odor. The cleaning fluid can gravity feed into the combustion chamber 30 and can promote the reduction of fecal matter into a liquid or semi-liquid state by the meshers 31. This can reduce or eliminate consumption of combustible fluid in the fecal preparation stage and can reduce overall fuel consumption by promoting an efficient burn cycle.

The vacuum 101 can draw waste and tissue into, and odors away from, the combustion chamber 30. The vacuum can also draw ash through the flue 72. See, FIG. 5. The ash is collected in a fire-proof bag 105. A second damper, or flue damper 110, regulates the interaction between the vacuum 101 and the exhaust vent 112 for drawing the odors and ash through the flue 72 depending on which phase of operation the incinerating commode is undergoing, i.e., collection of fecal matter, burning of fecal matter, or steam cleaning of the combustion chamber 30.

The operation of a vacuum system 121 is illustrated in FIG. 5. The vacuum 101 can draw toilet paper and other waste into the combustion chamber 30 during use. Additionally, the vacuum 101 can draw odor away from the combustion chamber 30 via an odor control system 104. The odor control system 104 can comprise the vacuum 101 that interconnects with the flue 72 via a vacuum odor horn 106 and a vacuum odor conduit 109. An odor control valve 108, which can be a butterfly valve, can open the vacuum odor conduit 109 between the vacuum 101 and vacuum odor horn 106 from a range of 100%-10% depending on the operation of the incinerating system. The odor control valve 108 can be fully open when the combustion chamber 30 is not incinerating the fecal matter. Odor can be drawn from the open back of the combustion chamber 30 through the flue 72, the vacuum odor horn 106, the vacuum odor conduit 109, and ultimately to the vacuum 101 and the fire proof bag 105.

During incineration, the flue 72 can be open to the atmosphere via flue damper 110. This can enable the heat and flames within the combustion chamber 30 to be exhausted, via vent 112, to the atmosphere. Also during incineration, the odor control valve 108 partially closes so that the vacuum 101 does not interfere with the combustion process. This enables the heat and flames from the combustion chamber 30 to vent outside via vent 112 and not into the vacuum 101.

When the combustion process is complete, the vacuum 101 can draw the incinerated fecal matter ash from the combustion chamber 30 to the vacuum 101 through an ash removal system 120. The ash removal system 120 can comprise a vacuum ash horn 122 and a vacuum ash conduit 124. The ash control valve 126, which can be a butterfly valve or other suitable means, can open the vacuum ash conduit 124 between the vacuum 101 and vacuum ash horn 122 from a range of 100%-0% depending on the operation of the incinerating system. The ash control valve 126 can be interconnected with the flue damper 110 via a linkage 128 that can be operated by a solenoid 129 or an air cylinder (not shown).

In operation, when the combustion chamber 30 is incinerating fecal matter, the flue damper 110 can be opened such that the heat and flames of the incineration process are vented to the atmosphere. During incineration, the ash control valve 126 can be closed. When the incineration process is completed, the flue damper 110 can close the flue 72 exit and open the passageway to connect the flue 72 with the vacuum ash horn 122. The linkage 128 can simultaneously open the ash control valve 126 such that the vacuum 101 can pull the ash from the combustion chamber 30 through the ash removal system 120 and into the vacuum 101 and the fire proof bag 105. While ash removal is underway, the odor control valve 108 can be open 10% to enable most of the vacuum to be available for ash removal, while still continuously removing odors from the combustion chamber 30.

Referring now back to FIG. 1a, a urine collector 80 can be carried on the front wall of the commode interior 25 and protrudes into the commode interior 25 to provide a separate receptacle for collecting the urine component of human waste. The urine collector 80 has downwardly converging sidewalls. The bottom edges of the urine collector 80 walls are in fluid connection with a urine conduit 85, which transfers the urine to a urine container 90. The urine component is separated from the fecal component to promote more efficient incineration of the fecal component. In an alternative embodiment, the commode body 20 can comprise two separate compartments, wherein one compartment would have the same general characteristics as the urine collector 80 described hereinabove.

As shown in FIG. 1a, a cleaning agent, which can be chlorine or another suitable agent, is stored within a cleaning agent tank 92. The cleaning agent can be used to spray the interior of the commode body during or after use by an individual. Spray nozzles 94 can be located, for example, underneath the rim of the commode interior 25 and spray downwards over the interior of the commode body 20 and the combustion chamber 30. Cleaning fluid can be sprayed into the commode interior 25 during or after use and can facilitate reduction of the fecal component of the waste, as mentioned above.

As shown in FIGS. 1a and 3b, in some embodiments, the separately collected urine can be utilized as a cooling system for cooling and cleaning the interior of the combustion chamber 30. The cleaning agent can be gravity fed to the urine container 90 through the urine collector 80 for intermixing with the urine. The cleaning agent/urine mixture can then be pumped through a cleaning fluid line 225 that interconnects with the nozzle 222 for atomizing the cleaning mixture directly into the combustion chamber 30.

After the incineration phase has occurred, the transmission of combustible gas through fuel conduit 61 can be terminated. See, FIG. 2. The cleaning agent/urine mixture can be sprayed into the combustion chamber 30 using a nozzle 222 and can enable the cleaning agent/urine mixture to be dispersed throughout the interior of the combustion chamber 30. The hot surface temperature of the combustion chamber 30 can react favorably with the cleaning agent/urine mixture producing a steam cleaning effect. The addition of the cleaning agent to the urine can eliminate odor caused by the urine being used as a steam cleaning agent. In addition the vacuum 101 can draw additional odors to the outside, further preventing odors.

A timer can control the operation of the cleaning cycle. In an exemplary embodiment, the burn cycle time can be one and a half minutes to five minutes. After the burn cycle time, the timer can control the dispersion of cleaning fluid/urine mixture into the hot combustion chamber 30. The cleaning fluid and urine can be presented to the combustion chamber 30 for an additional minute resulting in the combustion chamber 30 being both steam cleaned and cooled.

In operation the commode can be vented to the exterior of the corresponding water closet to the atmosphere. Such venting can prevent the commode from drawing conditioned air from the immediate vicinity that could result in a drop in ambient temperature similar to the use of an unvented fireplace.

In some embodiments, much of the incinerating commode can be installed outside. In other words, while it is necessary for some of the components, such as the commode body, to be located inside the building or facility in which the commode is to be used, much of the remaining mechanicals can be located outside. For instance, the vacuum and blower motors can be placed outside for, among other things, noise attenuation. Additionally, it may be necessary or desirable to place the combustible fluid housing 40 and/or the fuel container for the heat source 60, e.g. a fuel oil tank, outside for safety and/or convenience.

In still other embodiments, shown if FIG. 5, it may be desirable to include a heat exchange system with the incinerating commode. This can enable heat used during the combustion process that would normally be expelled via the vent 112 to be partially recovered. The heat exchanger system can include a heat exchanger placed in the flue 72 and/or the vent 112, one or more blowers, and duct work in communication with the heat exchanger and the facility. During incinerations, exhaust heat can first be passed over the heat exchanger. Air, taken from the house or structure in which the commode is installed, can be blown through the heat exchanger using, for example, a blower motor, and warmed. This warm air can then be ducted back into the house or structure in which the commode is installed thus recovering some of the thermal energy that would otherwise be exhausted into the atmosphere via the vent 112.

In still other embodiments, the flue 72 and/or vent 112 of the incinerating commode can be fitted with a condenser to recover liquid components of the exhaust gases. For example, water is a byproduct of combustion and is also evaporated from waste during incineration. This water can be recovered and used for various non-potable uses or can be distilled into pure drinking water. Additionally, urea, a major component of urine, can be condensed and refined for use in, among other things, fertilizer, pollution control systems, and protein synthesis.

The total operation time for the incinerating commode is approximately three minutes. This operation includes preparing the fecal matter for burning by injecting a combustible or a cleaning fluid, preheating the burning chamber if necessary, burning the fecal matter, and finally steam cleaning the combustion chamber. By removing the urine from the fecal matter, injecting a combustible or cleaning fluid, mixing the combustible or cleaning fluid with the fecal matter, utilizing a baffle, and utilizing one or more torches, the burn time and cost of burning the fecal matter is greatly reduced from prior incinerating commodes.

While the various embodiments of this invention have been described in detail with particular reference to exemplary embodiments, those skilled in the art will understand that variations and modifications can be effected within the scope of the invention as defined in the appended claims. For example, while multiple blower motors and a separate vacuum have been disclosed, the invention can also be practiced using fewer motors, or a single motor. The invention could be produced, for example, using a single air compressor. The air compressor can be plumbed such that it provides components both pressurized air and vacuum, using venturi vacuum generation, as necessary. The can allow the commode to be more economically produced and increase reliability.

Accordingly, the scope of the various embodiments of the present invention should not be limited to the above discussed embodiments, and should only be defined by the following claims and all applicable equivalents.

What is claimed is:

1. An incinerating commode for use in disposing of human waste comprising: a commode body having a commode interior; a combustion chamber in communication with the commode interior for receiving a fecal component of human waste, said combustion chamber further being mounted in a double-walled external housing, thereby creating a space for the flow of air or fluid to circulate around the exterior of said combustion chamber; a combustion chamber lid for sealing a top portion of the combustion chamber; a urine collector carried within the commode interior for receiving a urine component of human waste; a urine container in fluid communication with the urine collector for storing the urine component; a cleaning agent container disposed proximate the commode body for storing a cleaning agent; a heat source for incinerating the fecal component; a baffle having a plurality of offset tines that define a plurality of air channels disposed in a rear portion of the combustion chamber and having a first, closed position and a second, open position; a blower for injecting a cleaning fluid into the combustion chamber for cooling and cleaning the combustion chamber after incineration of the fecal component; wherein the blower, the cleaning agent container, and the urine container are in fluid communication; wherein the cleaning fluid comprises a mixture of urine from the urine container and cleaning agent from the cleaning, agent container; wherein, in the first position, the baffle substantially seals the rear of the combustion chamber; and wherein, in the second position, the baffle is configured to reflect a flame from the heat source back into the combustion chamber to improve combustion efficiency therein.

2. The incinerating commode of claim 1, further comprising a splash plate comprising a three-sided, conjoined orthogonal structure, each side being a primarily longitudinal piece having a planar surface wherein each planar surface slopes inward toward the enclosure formed by the union of the orthogonal structure, said splash plate being disposed between the commode body and the combustion chamber, to direct human waste into the combustion chamber and away from other components of the commode.

3. The incinerating commode of claim 1, wherein the heat source comprises one or more torches; and wherein the torches comprise one or more of natural gas, propane, diesel fuel, and fuel oil torches.

4. The incinerating commode of claim 1, wherein in the second position, the baffle creates a turbulent, recirculating flow in the combustion chamber to improve combustion efficiency therein.

5. The incinerating commode of claim 1, wherein the cleaning agent comprises chlorine.

6. The incinerating commode of claim 1, further comprising a commode lid pivotally coupled to the commode body and having a first, open position and a second, closed position; wherein the commode lid is further pivotally coupled to the baffle and the combustion chamber lid; and wherein the commode lid holds the baffle in the first, closed position when the commode lid is in the first, open position.

7. An incinerating commode for use in disposing of human waste, the commode having a commode cycle time, the commode comprising: a commode body having a commode interior; a fluid cooled combustion chamber in communication with the commode interior for receiving a fecal component of human waste, and in fluid communication with a hot water source, said combustion chamber further being mounted in a double-walled external housing, thereby creating a space for the flow of air or fluid to circulate around the exterior of said combustion chamber; a combustion chamber lid for sealing a top portion of the combustion chamber; a urine collector carried within the commode interior for receiving a urine component of human waste; a urine container in fluid communication with the urine collector for storing the urine component; a heat source for incinerating the fecal component; a flue in communication with the rear of the combustion chamber, said flue further attached to a vent to the ambient environment or a fireproof bag; a baffle having a plurality of offset tines that define a plurality of air channels, said baffle disposed in a rear portion of the combustion chamber, between said combustion chamber and said flue, and said baffle having a first, closed position and a second, open position; wherein water from the hot water source pre-heats the combustion chamber to improve efficiency of the combustion chamber; wherein the heat generated during incineration is absorbed by water from the hot water source to cool the combustion chamber to reduce commode cycle time; wherein, in the first position, the baffle substantially seals the rear of the combustion chamber; and wherein, in the second position, the baffle is configured to reflect a flame from the heat source back into the combustion chamber, and to create a turbulent, recirculating flow in the combustion chamber to improve combustion efficiency therein, and further, when said baffle is in the second position, said flue is partially opened, thereby, allowing combustion gasses to be emitted.

8. The incinerating commode of claim 7, further comprising a water circulation pump to circulate water between the incinerating commode and the hot water source wherein the water circulation pump is in fluid communication with the hot water source and the combustion chamber.

9. The incinerating commode of claim 7, wherein the combustion chamber is in fluid communication with a hot water source, thereby the heat absorbed the combustion chamber from water from the hot water source raises the temperature of the combustion chamber and improves the efficiency of the combustion chamber.

10. The incinerating commode of claim 7, wherein the hot water source is a hot water heater.

11. The incinerating commode of claim 7, wherein the hot water source is a boiler.

12. The incinerating commode of claim 7, further comprising a heat exchanger in communication with said flue on the incinerating commode, to extract excess heat from the exhaust of the incinerating commode.

13. The incinerating commode of claim 7, further comprising one or more mesher assemblies, wherein each mesher assembly further comprises: a mesher for breaking up the fecal component and intermixing the cleaning fluid therewith; a mesher arm coupled to the mesher such that the mesher arm is substantially perpendicular to the mesher; a slide arm coupled to the mesher such that the slide arm is substantially perpendicular to the mesher, for supporting the mesher assembly where it passes through the combustion chamber; a mesher solenoid for moving the mesher back and forth in an oscillating motion within the combustion chamber; a control plate for coupling the mesher arm, the slide arm, and the mesher solenoid in a parallel, but offset, manner; and a mesher bearing for supporting the mesher assembly on the slide arm and for reducing the sliding friction of the mesher assembly on the slide arm as it oscillates.

14. The incinerating commode of claim 13 wherein the mesher solenoid is one selected from the group consisting of an air solenoid, an electric solenoid, or a hydraulic solenoid.

15. A method for disposing human waste in an incinerating commode comprising: receiving the fecal component of human waste in a combustion chamber mounted in a double-walled external housing; receiving the urine component of human waste in a urine collector; injecting a first portion of a cleaning fluid, comprising a mixture of the urine component combined with a cleaning agent into the combustion chamber; sealing a top portion of the combustion chamber with a combustion chamber lid; operating one or more mesher assemblies in an oscillating motion to break up the fecal component and intermix the cleaning fluid therewith; opening a baffle having a plurality of offset tines that define a plurality of air channels, disposed in a rear portion of the combustion chamber, to reflect heat into the combustion chamber and create a turbulent flow in the combustion chamber during incineration; incinerating the fecal component with a heat source; stopping the oscillating motion of the meshers; removing ash from the combustion chamber with a vacuum source; and injecting a second portion of cleaning fluid in the combustion chamber to steam clean and cool the combustion chamber.

16. The method of claim 15, wherein the first portion of cleaning fluid further comprises a combustible fluid.

17. The method of claim 15, wherein the combustion chamber lid is pivotally coupled to a commode seat; the commode seat is pivotally coupled to the incinerating commode; and closing the combustion chamber lid is performed by closing the commode seat.

18. The method of claim 15, further comprising: activating a water circulation pump to preheat the combustion chamber; wherein the water circulation pump is in fluid communication with a hot water source and the combustion chamber.

19. The method of claim 18, wherein the heat generated during incineration is used to heat the water in the hot water source.

20. The method of claim 15, wherein the baffle is pivotally coupled to a commode seat; the commode seat is pivotally coupled to the incinerating commode; and opening the baffle is performed by closing the commode seat.

21. The incinerating commode of claim 1, further comprising one or more mesher assemblies, wherein each mesher assembly further comprises: a mesher for breaking up the fecal component and intermixing the cleaning fluid therewith; a mesher arm coupled to the mesher such that the mesher arm is substantially perpendicular to the mesher; a slide arm coupled to the mesher such that the slide arm is substantially perpendicular to the mesher, for supporting the mesher assembly where it passes through the combustion chamber; a mesher solenoid for moving the mesher back and forth in an oscillating motion within the combustion chamber; a control plate for coupling the mesher arm, the slide arm, and the mesher solenoid in a parallel, but offset, manner; and a mesher hearing for supporting the mesher assembly on the slide arm and for reducing the sliding friction of the mesher assembly on the slide arm as it oscillates.

* * * * *